US009544529B2

(12) United States Patent
Yokoi et al.

(10) Patent No.: US 9,544,529 B2
(45) Date of Patent: Jan. 10, 2017

(54) INFORMATION PROCESSING APPARATUS, IMAGE CAPTURING APPARATUS, AND CONTROL METHODS FOR THE SAME

(71) Applicant: CANON KABUSHIKI KAISHA, Tokyo (JP)

(72) Inventors: Mayu Yokoi, Yokohama (JP); Toshinori Koba, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/095,420

(22) Filed: Dec. 3, 2013

(65) Prior Publication Data
US 2014/0161413 A1 Jun. 12, 2014

(30) Foreign Application Priority Data

Dec. 10, 2012 (JP) .................................. 2012-269785

(51) Int. Cl.
H04N 5/935 (2006.01)
H04N 5/77 (2006.01)
(Continued)

(52) U.S. Cl.
CPC .......... *H04N 5/77* (2013.01); *G06F 17/30017* (2013.01); *G06F 17/30772* (2013.01);
(Continued)

(58) Field of Classification Search
CPC ..................... H04N 21/8456; H04N 21/26285; H04N 21/2225; H04N 21/44016; H04N 21/6125; H04N 21/8455; H04N 21/23439; H04N 21/26291
(Continued)

(56) References Cited

U.S. PATENT DOCUMENTS 8,423,606 B1 * 4/2013 Streeter ............... H04L 65/4084
709/203
9,100,460 B2 * 8/2015 Eguchi ................. H04L 65/605
(Continued)

FOREIGN PATENT DOCUMENTS

JP 11-328073 A 11/1999
JP 2005-086362 A 3/2005
(Continued)

OTHER PUBLICATIONS

European Search Report on Feb. 27, 2014, that issued in the corresponding European Patent Application No. 13196550.1.
(Continued)

*Primary Examiner* — Helen Shibru
(74) *Attorney, Agent, or Firm* — Cowan, Liebowitz & Latman, P.C.

(57) ABSTRACT

The information processing apparatus which plays video sent from a image capturing apparatus, comprises a list requesting unit which sends a request for segment list to the image capturing apparatus to acquire the segment list, a determination unit that determines a segment to be requested among the segments indicated in the acquired segment list, a first segment requesting unit that sends a request for the determined segment to the image capturing apparatus, a first segment acquisition unit that acquires the requested segment, and a playing unit that plays the acquired segment, wherein the list requesting unit sends a request for a latest segment list to the image capturing apparatus, whenever the segment is acquired a predetermined number of times by the first segment acquisition unit, and the determination unit determines a segment to be requested, based on the latest segment list.

11 Claims, 12 Drawing Sheets

(51) Int. Cl.
*G06F 17/30* (2006.01)
*H04N 5/232* (2006.01)
*H04N 21/262* (2011.01)
*H04N 21/845* (2011.01)
*H04N 21/4223* (2011.01)
*H04N 21/643* (2011.01)

(52) U.S. Cl.
CPC ....... *H04N 5/232* (2013.01); *H04N 21/26258* (2013.01); *H04N 21/4223* (2013.01); *H04N 21/64322* (2013.01); *H04N 21/8456* (2013.01)

(58) Field of Classification Search
USPC ........................................ 386/224, 210, 362
See application file for complete search history.

(56) References Cited

U.S. PATENT DOCUMENTS

| | | | | |
|---|---|---|---|---|
| 9,277,261 | B2* | 3/2016 | Yokoi | H04N 5/23206 |
| 2002/0003881 | A1* | 1/2002 | Reitmeier | H04L 9/34 380/210 |
| 2004/0255219 | A1* | 12/2004 | Grossman, IV | H04L 1/1628 714/748 |
| 2005/0134689 | A1* | 6/2005 | Hatanaka | 348/207.1 |
| 2007/0195350 | A1* | 8/2007 | Hattori | 358/1.13 |
| 2008/0193099 | A1* | 8/2008 | Nakai | G11B 27/034 386/281 |
| 2010/0057928 | A1 | 3/2010 | Kapoor et al. | |
| 2010/0094972 | A1* | 4/2010 | Zuckerman | H04L 67/1008 709/219 |
| 2010/0103287 | A1* | 4/2010 | Oikawa | 348/231.99 |
| 2010/0169303 | A1 | 7/2010 | Biderman et al. | |
| 2011/0083144 | A1* | 4/2011 | Bocharov | H04N 7/17318 725/32 |
| 2011/0119394 | A1* | 5/2011 | Wang | H04N 21/23439 709/231 |
| 2011/0231660 | A1 | 9/2011 | Kanungo | |
| 2012/0263434 | A1 | 10/2012 | Wainner et al. | |
| 2013/0290402 | A1* | 10/2013 | Gavade | H04N 21/26258 709/203 |
| 2015/0026751 | A1* | 1/2015 | Yokoi | H04N 21/44209 725/131 |
| 2015/0172758 | A1* | 6/2015 | Koba | H04N 21/44004 386/224 |
| 2015/0341678 | A1* | 11/2015 | Koba | H04N 21/234 725/93 |
| 2015/0373073 | A1* | 12/2015 | Yokoi | H04N 5/23245 709/219 |

FOREIGN PATENT DOCUMENTS

| | | |
|---|---|---|
| JP | 2008-270908 A | 11/2008 |
| JP | 4341616 A | 10/2009 |
| JP | 2012-514276 A | 6/2012 |
| TW | 201204011 A | 1/2012 |

OTHER PUBLICATIONS

Jul. 11, 2016 Chinese Office Action, without an English Translation, that issued in Chinese Patent Application No. 201310665336.5.
The above patent documents were cited in a Oct. 24, 2016 Japanese Office Action, which is enclosed without an English Translation, that issued in Japanese Patent Application No. 2012-269785.

* cited by examiner

INFORMATION PROCESSING APPARATUS, IMAGE CAPTURING APPARATUS, AND CONTROL METHODS FOR THE SAME

BACKGROUND OF THE INVENTION

Field of the Invention

The present invention relates to an information processing apparatus, an image capturing apparatus, and a control method for the same.

Description of the Related Art

In conventional live streaming, since the real-time quality is considered important, the RTP (Real-time Transport Protocol)/UDP (User Datagram Protocol) protocol has been used in the transfer of stream data. This live streaming is typically utilized for viewing. However, this method can result in data loss and the like, and is not suitable in cases such as where it is desired to record stream data in the receiving terminal apparatus. In contrast, there is a method that switches operation between a normal mode in which the camera continuously transmits captured video and a file transfer mode in which the camera, under instruction from a client, temporarily stores captured video as a file and transfers the file (Japanese Patent No. 4341616).

On the other hand, a method that realizes streaming by utilizing segment data obtained by dividing the streaming data into segments of fixed duration and a playlist containing this information is also conceivable. However, in the above conventional example, there is a problem in that since HTTP is used as the communication protocol and long delays can occur depending on network conditions, the playlist method is not suitable for live viewing due to delays in segment acquisition.

SUMMARY OF THE INVENTION

This specification in its first aspect provides an information processing apparatus that has a communication unit for communicating with an image capturing apparatus and plays video data captured by the image capturing apparatus by sequentially acquiring segments, which are each a portion of the video data, the apparatus comprising: a list requesting unit that sends a request for a segment list to the image capturing apparatus via the communication unit, where the segment list includes segment information of video data that is being captured by the image capturing apparatus; a list acquisition unit that acquires the segment list requested by the segment list requesting unit; a determination unit that determines a segment to be requested among the segments indicated in the segment list acquired by the list acquisition unit; a first segment requesting unit that sends a request for the segment determined by the determination unit to the image capturing apparatus via the communication unit; a first segment acquisition unit that acquires the segment requested by the first segment requesting unit; and a playing unit that plays the segment acquired by the first segment acquisition unit; wherein the list requesting unit sends a request for a latest segment list to the image capturing apparatus, whenever the segment is acquired a predetermined number of times by the first segment acquisition unit, and wherein the determination unit determines a segment to be requested, based on the latest segment list.

This specification in its second aspect provides an image capturing apparatus that has an image capturing unit and sequentially transmits segments, which are each a portion of video data obtained by the image capturing unit, while performing image capture using the image capturing unit, the apparatus comprising: a management unit that manages segments obtained by the image capturing unit, using a segment list; a list transmission unit that transmits the segment list in response to a segment list request from an information processing apparatus; and a segment transmission unit that transmits a segment requested by the information processing apparatus among the segments managed in the segment list, wherein the management unit adds new segment information to the segment list, whenever a new segment is obtained by the image capturing unit, and wherein the management unit deletes the segment information of the segment transmitted to the information processing apparatus by the segment transmission unit from the segment list.

This specification in its third aspect provides a method for controlling an information processing apparatus that has a communication unit configured to communicate with an image capturing apparatus and plays video data captured by the image capturing apparatus by sequentially acquiring segments, which are each a portion of the video data, comprising: a list requesting step of sending a request for a segment list to the image capturing apparatus via the communication unit, where the segment list includes segment information of video data that is being captured by the image capturing apparatus; a list acquisition step of acquiring the segment list requested in the segment list requesting step; a determination step of determining a segment to be requested among the segments indicated in the segment list acquired in the list acquisition step; a first segment requesting step of sending a request for the segment determined by the determination step to the image capturing apparatus via the communication unit; a first segment acquisition step of acquiring the segment requested in the first segment requesting step; and a playing step of playing the segment acquired in the first segment acquisition step, wherein, in the list requesting step, a request for a latest segment list is sent to the image capturing apparatus, whenever the segment is acquired a predetermined number of times in the first segment acquisition step, and wherein, in the determination step, a segment to be requested is determined based on the latest segment list.

This specification in its fourth aspect provides a method for controlling an image capturing apparatus that has an image capturing unit and sequentially transmits segments, which are each a portion of video data obtained by the image capturing unit, while performing image capture using the image capturing unit, comprising: a management step of managing segments obtained by the image capturing unit, using a segment list; a list transmission step of transmitting the segment list in response to a segment list request from an information processing apparatus; and a segment transmission step of transmitting a segment requested by the information processing apparatus among the segments managed in the segment list, wherein, in the management step, new segment information is added to the segment list, whenever a new segment is obtained by the image capturing unit, and wherein, in the management step, the segment information of the segment transmitted to the information processing apparatus in the segment transmission step is deleted from the segment list.

According to the present invention, in an image capturing apparatus capable of communicating with an external apparatus, it is possible to save data without data loss while suppressing any effect on viewing, particularly in the case of recording streaming data to the external apparatus by live streaming.

Further features of the present invention will become apparent from the following description of exemplary embodiments (with reference to the attached drawings).

DESCRIPTION OF THE EMBODIMENTS

Hereinafter, embodiments according to the present invention will be described in detail in accordance with the accompanying drawings.

First Embodiment

Figure 1:
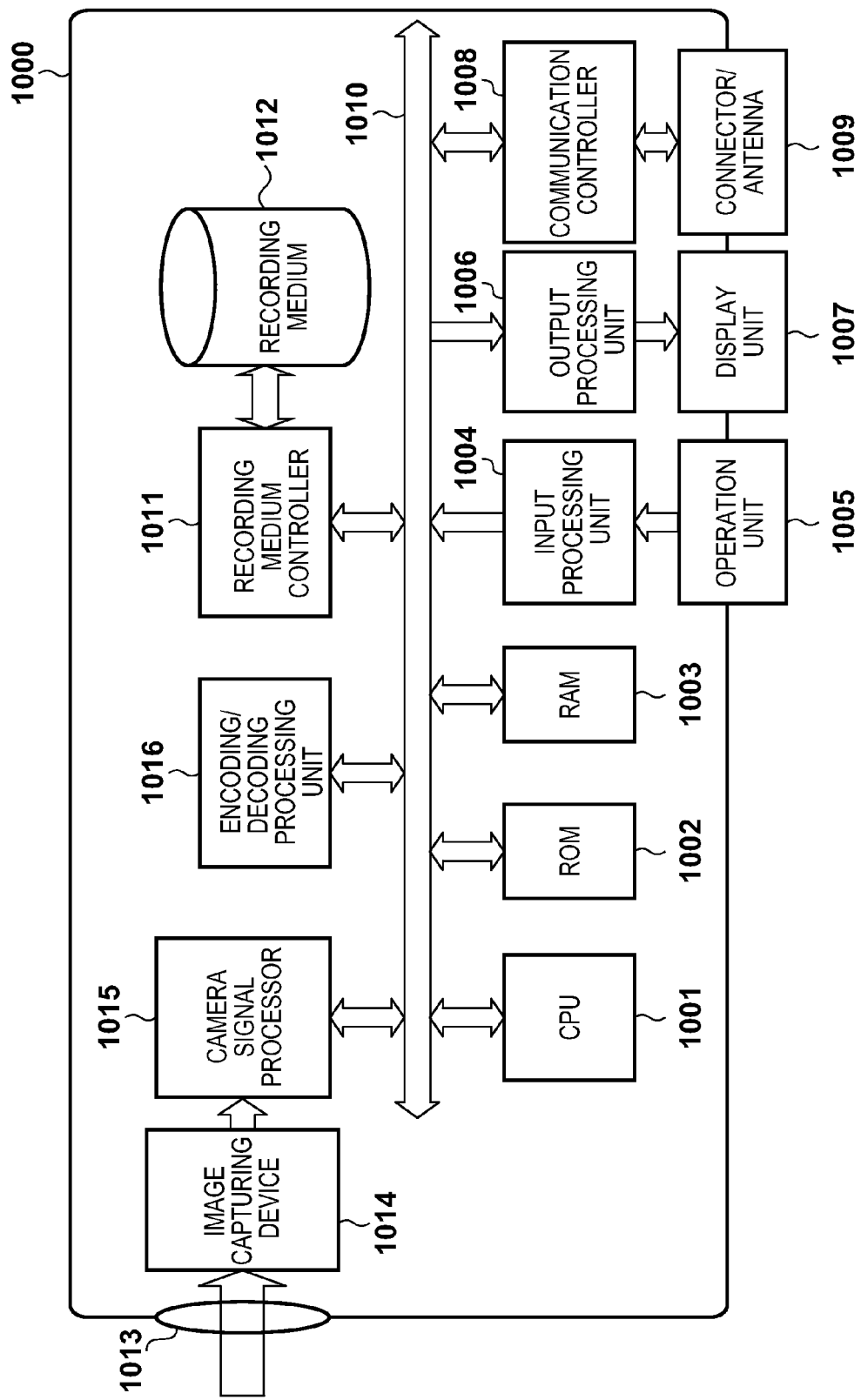
FIG. 1 is a diagram showing an exemplary configuration of a camera 1000 to which a first embodiment is applicable.
Figure 2:
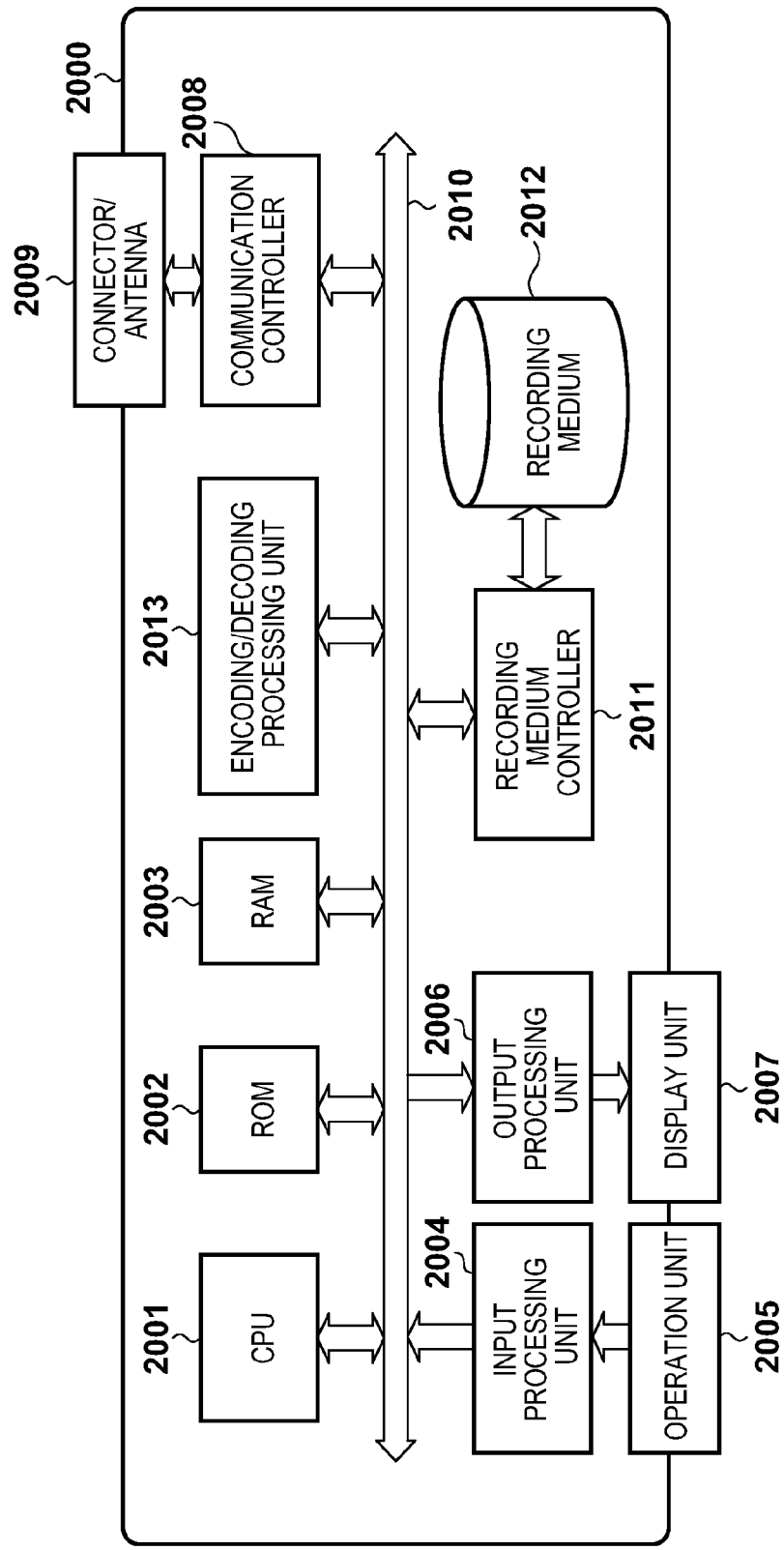
FIG. 2 is a diagram showing an exemplary configuration of a terminal apparatus 2000 to which the first embodiment is applicable.

FIGS. 1 and 2 show exemplary configurations of a camera 1000 serving as an image capturing apparatus and a terminal apparatus 2000 serving as an information processing apparatus that displays video received from the camera 1000, the camera 1000 and the terminal apparatus 2000 being constituent members of a video processing system of a first embodiment. As the image capturing apparatus, a camera mobile phone or a so-called tablet can also be used, besides a still camera or a video camera whose main function is so-called image capture. Information processing apparatuses including a mobile phone such as a so-called smart phone, a so-called tablet, a TV and the like can also be used for the terminal apparatus 2000, besides a typical personal computer.

In the camera 1000 of FIG. 1, a CPU (Central Processing Unit) 1001, a ROM (Read Only Memory) 1002, a RAM (Random Access Memory) 1003, an input processing unit 1004, an output processing unit 1006, a communication controller 1008, a recording medium controller 1011, a camera signal processor 1015 and an encoding/decoding processing unit 1016 are connected to an internal bus 1010. The constituent elements connected to the internal bus 1010 are configured so as to be able to exchange data with each other via the internal bus 1010.

The ROM 1002 has stored therein various programs and settings data for operations of the CPU 1001. A flash memory or the like is also included. In the RAM 1003, programs, variables, temporary data for tasks and the like that are required during operations of the CPU 1001 are stored as appropriate.

The CPU 1001 controls the constituent elements of this camera 1000 in accordance with programs stored in the ROM 1002 or a recording medium 1012, using the RAM 1003 as a work memory.

An optical system 1013 is an image capturing lens that includes a focus mechanism, a diaphragm mechanism and the like, and forms an optical image of a subject. An image capturing device 1014 is constituted by a CCD sensor, a CMOS sensor or the like, and here includes an A/D convertor and converts the optical image into an analog electrical signal, and then converts the analog electrical signal into a digital signal.

The camera signal processor 1015 performs processing such as resizing that involves predetermined pixel interpolation and reduction, color conversion and various correction processing on the digital signal converted by the image capturing device 1014, under the control of the CPU 1001.

The encoding/decoding processing unit 1016 compression encodes the digital signal processed by the camera signal processor 1015 into a predetermined format at a predetermined bit rate, or decodes compression encoded video data, under the control of the CPU 1001.

Note that although audio is not particularly illustrated, in the case of distributing video with audio, a microphone, an A/D convertor for digitizing audio analog signals and a configuration for encoding digital data will be provided. Naturally, at the time of video recording, audio will be simultaneously recorded together with the video, and video data with audio will be generated by the encoding/decoding processing unit 1016 multiplexing the video and audio.

The input processing unit 1004 receives a user operation on an operation unit 1005, generates a control signal according to the operation, and supplies the control signal to the CPU 1001. For example, the operation unit 1005 has a text input device such as a keyboard, a pointing device such as mouse or a touch panel, and the like, as input devices for receiving user operations. Also, a remotely operable device such as an infrared remote control is also included. Note that a touch panel is an input device that is configured such that coordinate information that depends on the position touched on an input unit having a planer configuration, for example, is output. The camera 1000 can thereby be operated according to a user operation.

The output processing unit 1006 outputs a display signal for causing display to a display unit 1007, based on display data of a GUI (Graphical User Interface) or the like generated by the CPU 1001 in accordance with a program.

Note that in the case of using a touch panel as the operation unit 1005, the operation unit 1005 and the display unit 1007 can be integrated as one. For example, the touch panel is configured so that the transmissivity of light is high enough to not interfere with the display of the display unit 1007, and is attached to an upper layer of the display surface of the display unit 1007. The input coordinates of the touch panel and display coordinates on the display unit 1007 are also mapped to each other. A GUI that makes it appear as if the screen displayed on the display unit 1007 is directly operable by the user can thereby be configured.

The recording medium controller 1011 has connected thereto a recording medium 1012 such as an HDD or a nonvolatile semiconductor memory, and performs reading of data from the connected recording medium 1012 and writing of data to the recording medium 1012, under the control of the CPU 1001. Note that a recording medium 1012 that is connectable to the recording medium controller 1011 may be a removable nonvolatile semiconductor memory such as a memory card, for example, that is connected via a socket or the like not shown.

The recording medium 1012 can also record information required for control by the CPU 1001, besides captured video data.

The communication controller 1008 communicate with an external apparatus (terminal apparatus 2000 in the embodiments), via a connector (wired)/antenna (wireless) 1009, under the control of the CPU 1001. Communication can be performed using standards such as IEEE 802.11 and Bluetooth for wireless communication and IEEE 802.3 for wired communication.

Since most of the configuration of the terminal apparatus 2000 in FIG. 2 is similar to the camera 1000, the description of constituent elements from a CPU 2001 to a recording medium 2012 that overlaps with the camera 1000 will be omitted. An encoding/decoding processing unit 2013 decodes compression encoded video data, and re-encodes decoded data if required, under the control of the CPU 2001.

Figure 3:
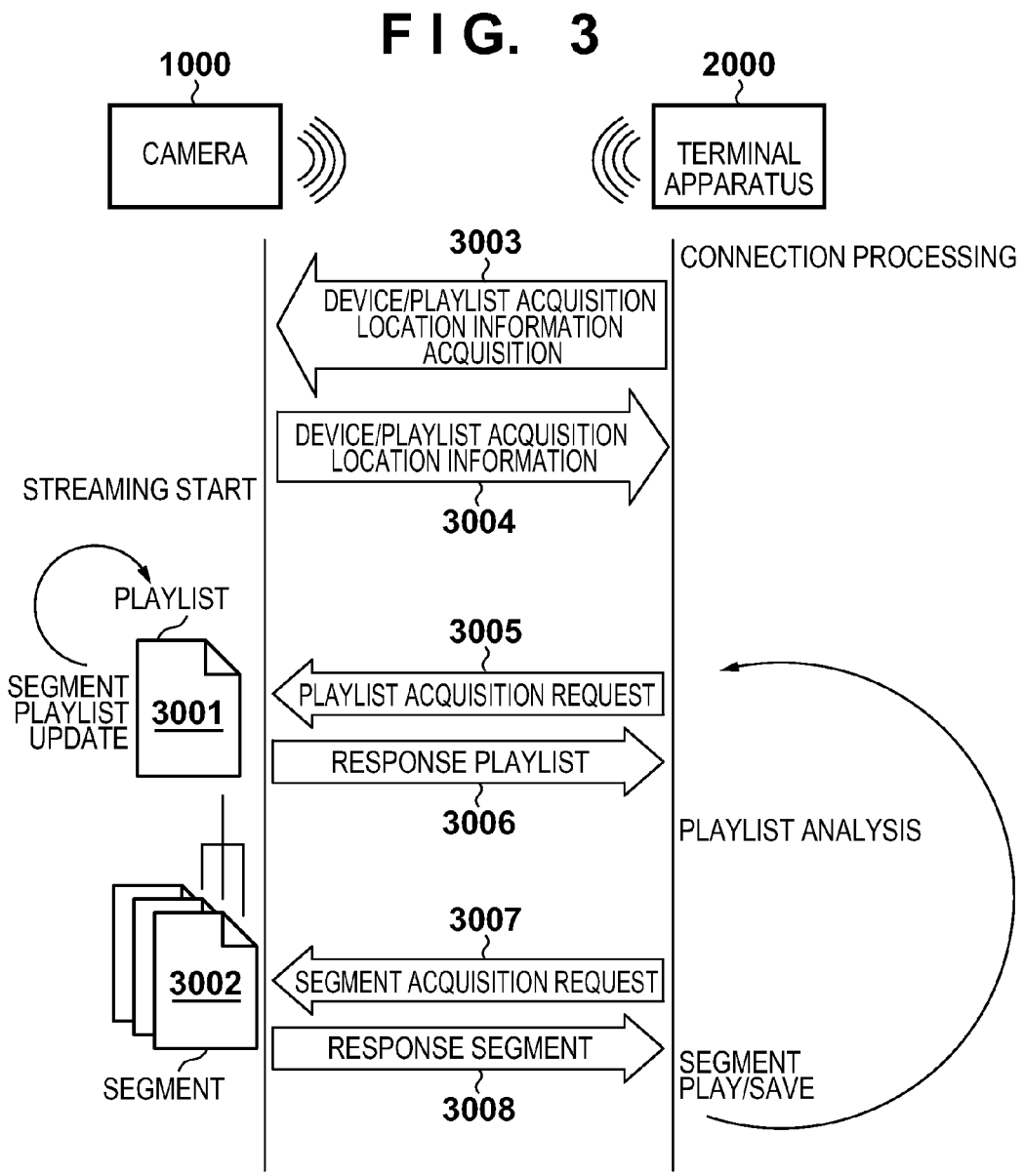
FIG. 3 is a diagram showing a communication sequence in a communication system according to the first embodiment.

FIG. 3 is a diagram showing an exemplary communication system according to the first embodiment. The communication system of the present embodiment executes live streaming utilizing a playlist. First, the basic operations of streaming utilizing a playlist are as follows.

Process 1: A server (camera 1000 in the embodiments) divides streaming data into segments of fixed duration, and creates a playlist that lists (describes) the acquisition locations of the segments. In the case of live streaming, since segments are generated periodically, a sliding window playlist that is dynamically updated (by deletion/addition) when a new segment is generated into a playlist having new contents is used.

Process 2: A client (terminal apparatus 2000 in the embodiments) acquires and analyzes the playlist, and acquires data from the segment data acquisition locations in list order.

Process 3: The client plays/displays or saves the acquired data.

Process 4: The server and the client repeat processes 1 to 3 until the end of the playlist (end of streaming).

Hereinafter, outline operations of live streaming utilizing a playlist will be described.

On the basis on the basic operations described above, outline operations of live streaming utilizing a playlist in the present embodiment will now be described using FIGS. 1, 2, 3 and 8.

When the user executes a live streaming mode from the operation unit 1005 in the camera 1000, the camera 1000 sets the communication controller 1008 to a communicable state, under the control of the CPU 1001.

Furthermore, the user launches an application required for communication/connection processing and live streaming by operating an operation unit 2005 in the terminal apparatus 2000. In response, the CPU 2001 of the terminal apparatus 2000 controls a communication controller 2008, starts communication with the camera 1000, and performs connection processing, in accordance with a program stored in a ROM 2002 or a recording medium 2012.

Here, the camera 1000 and the terminal apparatus 2000 use HTTP (Hypertext Transfer Protocol) as a communication protocol. Also, UPnP (Universal Plug and Play) is supported in communication/connection. The UPnP-compatible terminal apparatus 2000, when connecting to a network, sets an IP (Internet Protocol) address using DHCP (Dynamic Host Configuration Protocol) or Auto IP. The terminal apparatus 2000, having acquired an IP address, performs a device search and acquires information on the type, service function and the like of devices that respond, using "Device Discovery and Control", in order to mutually recognize other devices on the network (step 3003). The camera 1000 sends back device information, playlist acquisition location information of device-specific information, and the like in response to a device search request from the terminal apparatus 2000 (step 3004).

When the processing for connecting the camera 1000 and the terminal apparatus 2000 has been completed, the camera 1000 starts live streaming.

Figure 8:
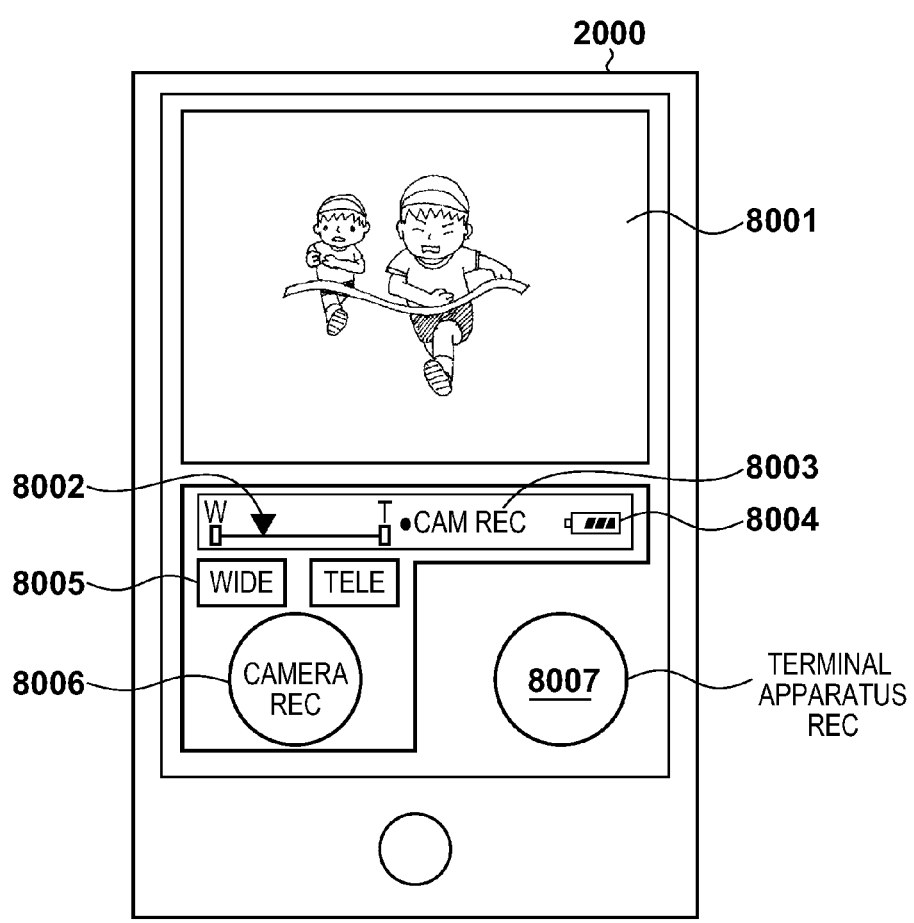
FIG. 8 is a diagram showing an exemplary screen of the terminal apparatus 2000 according to the first embodiment.

FIG. 8 is an exemplary live streaming application screen on the terminal apparatus 2000, and shows an example in which the operation unit 2005 and a display unit 2007 are integrated as one. Live streaming data is displayed in a display area 8001, and the camera status is indicated by zoom position information (8002), recording state (8003), battery information (8004), and the like.

In live streaming, the CPU 1001 of the camera 1000 starts signal output from the image capturing device 1014, processes the output into suitable video data using the camera signal processor 1015, and passes the data to the encoding/decoding processing unit 1016. At this time, the CPU 1001 also passes information relating to the camera status such as zoom magnification (or focal length) to the encoding/decoding processing unit 1016.

The encoding/decoding processing unit 1016 compression encodes the received video data, camera status information and the like into predetermined format at a predetermined bit rate, and, furthermore, divides the video data into segments of a predetermined duration Ts, and saves the resultant data as segment data (3002) in the RAM 1003 or the recording medium 1012. Note that, in the present embodiment, Ts=0.5 sec. Accordingly, to be precise, in the terminal apparatus 2000, video is received and played or recorded Ts seconds (0.5 seconds) after being captured by the camera 1000.

The CPU 1001 generates path information associated with the segment data storage location. The path information is used as acquisition location information when the terminal apparatus 2000 performs segment acquisition, and the CPU 1001 creates a playlist 3001 and records the segment information to the playlist together with the path information.

Figure 4:
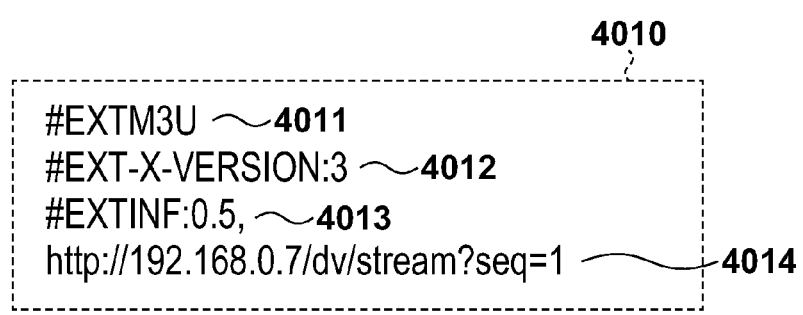
FIG. 4 is a diagram showing an exemplary playlist according to the first embodiment.

Here, the playlist 3001 will be described in detail. FIG. 4 is an exemplary playlist according to the first embodiment.

A playlist 4010 is in Extended M3U format, with an identifier tag being described in the first line (4011), and a tag showing the playlist version and the version being described in the second line (4012). The version is "3" in present example. A tag showing the duration of segment data 3002 and the duration (sec) in integer or decimal form are described in the third line (4013). In the present embodiment, given that segment data duration is set as Ts=0.5 (sec), the segment data duration is also given as "0.5" in the present example. The acquisition location path (includes query parameter) of the segment data 3002 is described in the fourth line (4014). The third line (4013) and the fourth line (4014) are typically required to be described consecutively as they contain information relating to the segment data 3002.

A playlist 4010 is exemplary contents of the playlist 3001 of FIG. 3 in which segment information (4013, 4014) is recorded.

The terminal apparatus 2000 is assumed to store the predetermined duration Ts of the segment data 3002 in advance, or be able to obtain the predetermined duration Ts at the time of device information acquisition at step S3004 from the device information of the camera 1000.

The terminal apparatus 2000 sends a playlist acquisition request (HTTP GET method) to the playlist acquisition location acquired at step 3004 after approximately Ts (sec) (step 3005) after the start of live streaming.

The camera 1000 transmits the playlist 3001 (=4010) in which one segment information set (4013, 4014) is described to the terminal apparatus 2000 as a response playlist (step S3006).

The terminal apparatus 2000 analyzes the received playlist 4010 and sends a segment acquisition request (HTTP GET method) to the camera 1000 which is the acquisition location of segment information (step 3007).

The camera 1000 transmits the requested segment 3002 as a response segment (step 3008).

The terminal apparatus 2000, after the received segment 3002 has been passed to the encoding/decoding processing unit 2013 and decoded, performs play/display on the display unit 2007 via the output processing unit 2006. When there is input of an instruction from the user to a terminal apparatus REC 8007, a data portion obtained by excluding the header and the like from the decoded data or the segment 3002 is recorded and saved to the recording medium 2012 by the live streaming application. The sequentially received segment data sets are then merged and recorded.

During streaming, the camera 1000 generates segments and updates the playlist approximately every Ts (sec). Also, the camera 1000 deletes segment information acquired by the terminal apparatus 2000 from the playlist.

The terminal apparatus 2000, whenever the playlist is updated by the camera 1000, acquires the updated playlist (step 3005) approximately every Ts (sec), and requests acquisition of corresponding segment data, based on the segment information contained in the playlist 3001.

Figure 5A:
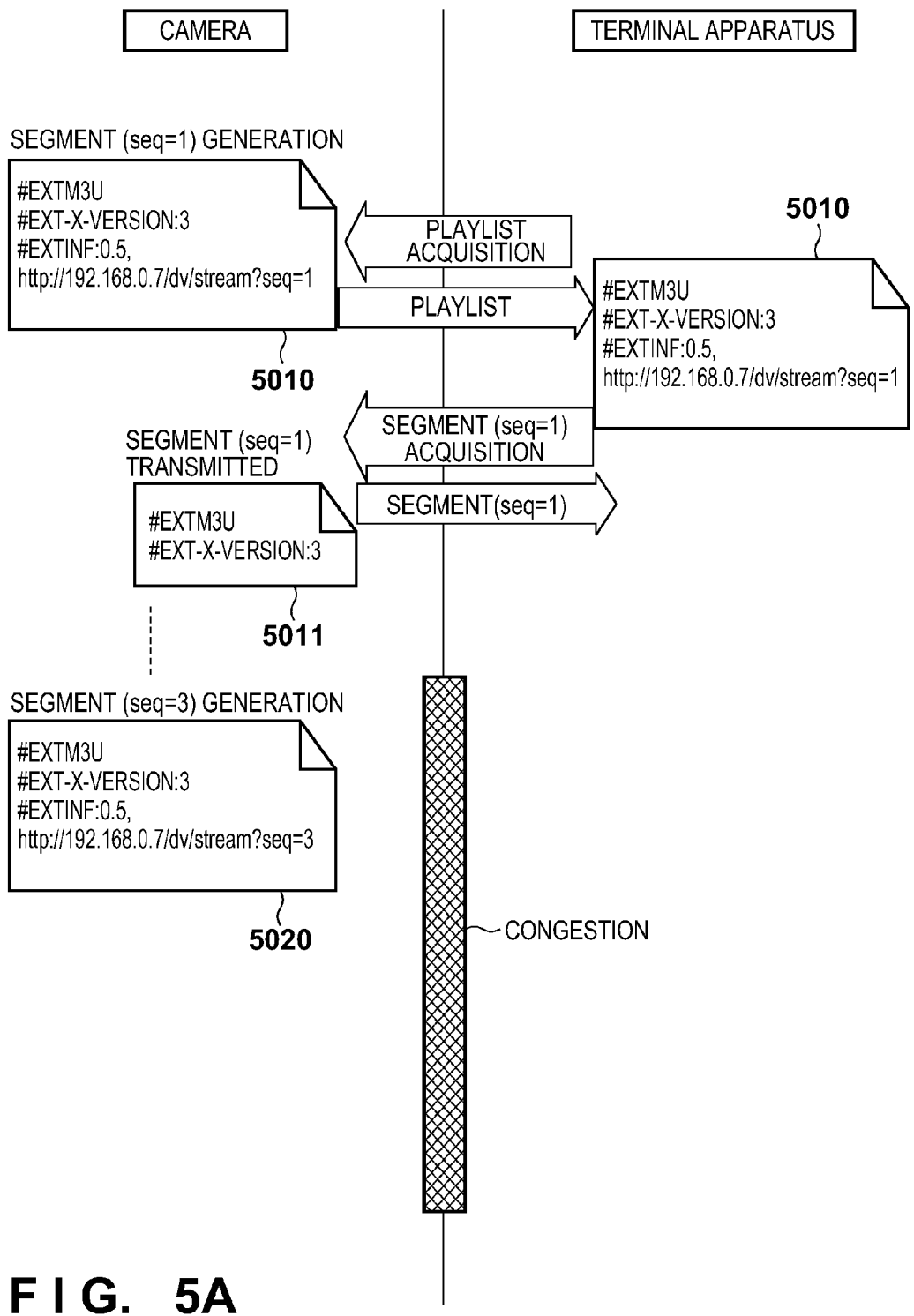
FIGS. 5A and 5B are diagrams showing an exemplary transition of a playlist including at a time of congestion according to the first embodiment.
Figure 5B:
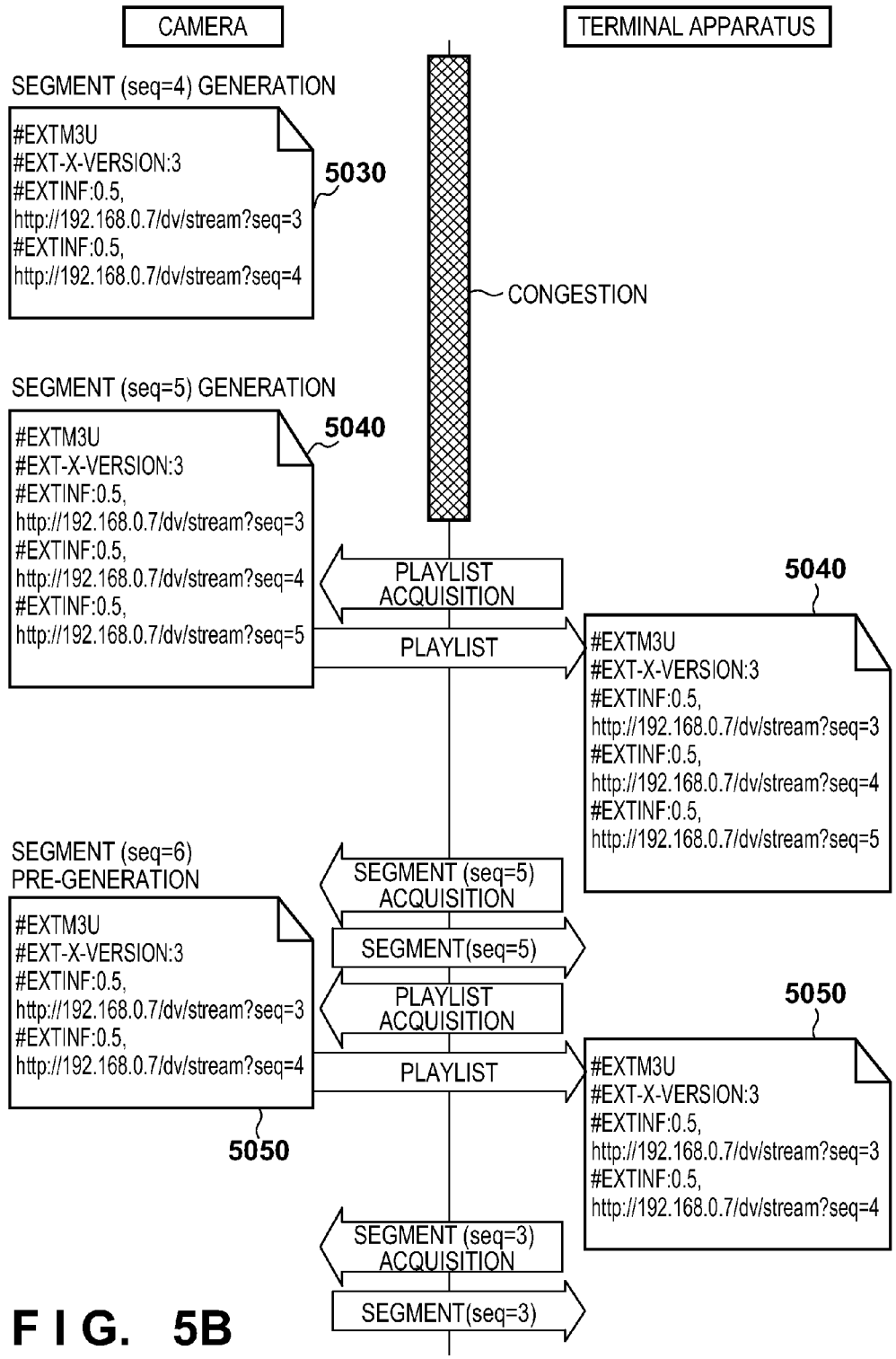

When communication conditions are good, the series of processing from playlist acquisition (step 3005) to the response segment (step 3008) is performed periodically. However, in actuality, it periodically becomes impossible to perform communication due to congestion and the like. FIGS. 5A and 5B show the transition of a playlist when congestion occurs. Reference numerals 5010 to 5050 in the diagram show an exemplary playlist at various stages.

Note that an ID unique to the terminal apparatus or application is added in request processing (steps 3005 to 3007) of the terminal apparatus 2000. The camera 1000 of the present embodiment then performs streaming only in response to a request including the ID attached to the initial request. In other words, the camera 1000 and terminal apparatus 2000 of the present embodiment only perform streaming in a one-to-one connection.

Figure 6:
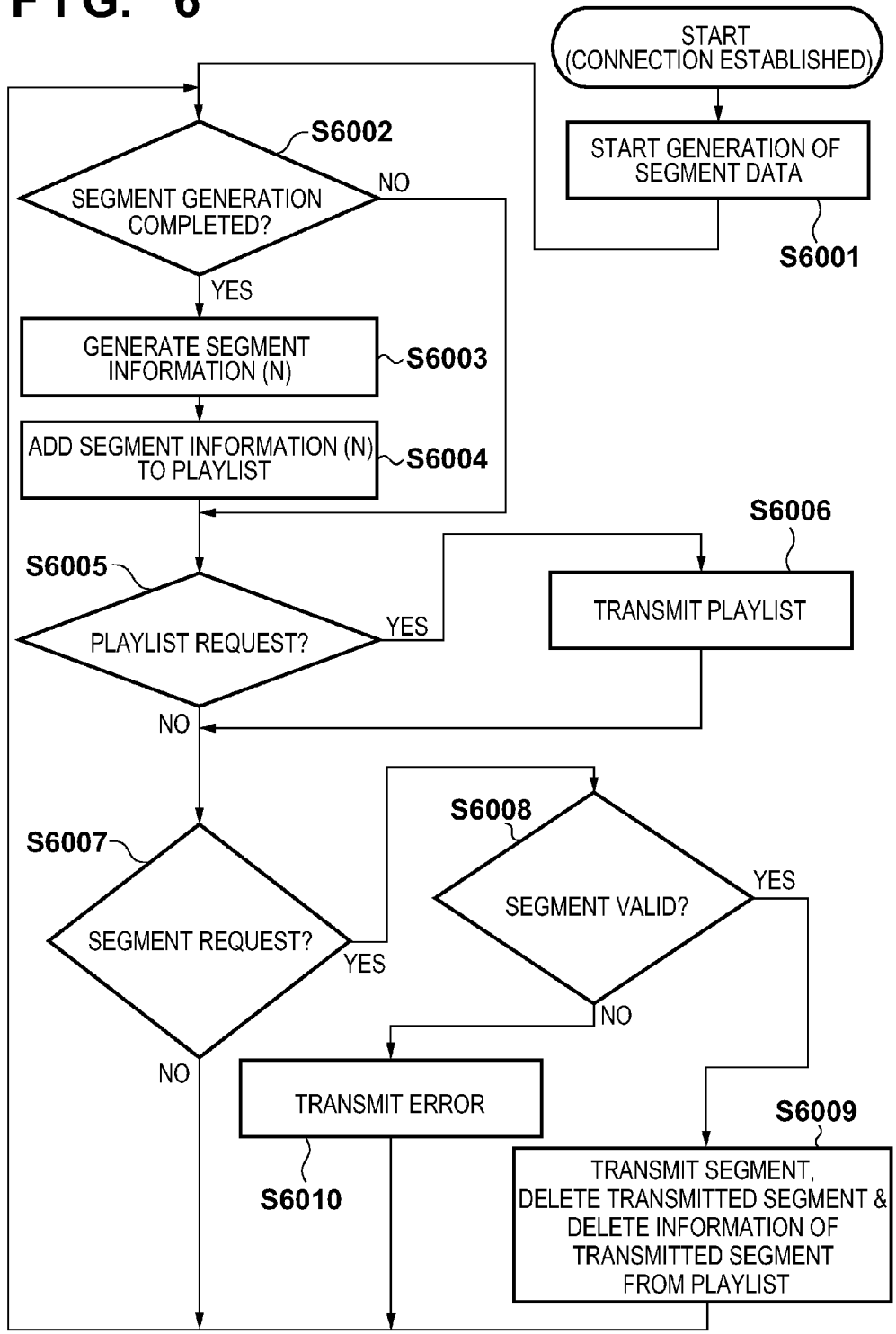
FIG. 6 is a diagram showing a flowchart of processing by the camera 1000 according to the first embodiment.
Figure 7:
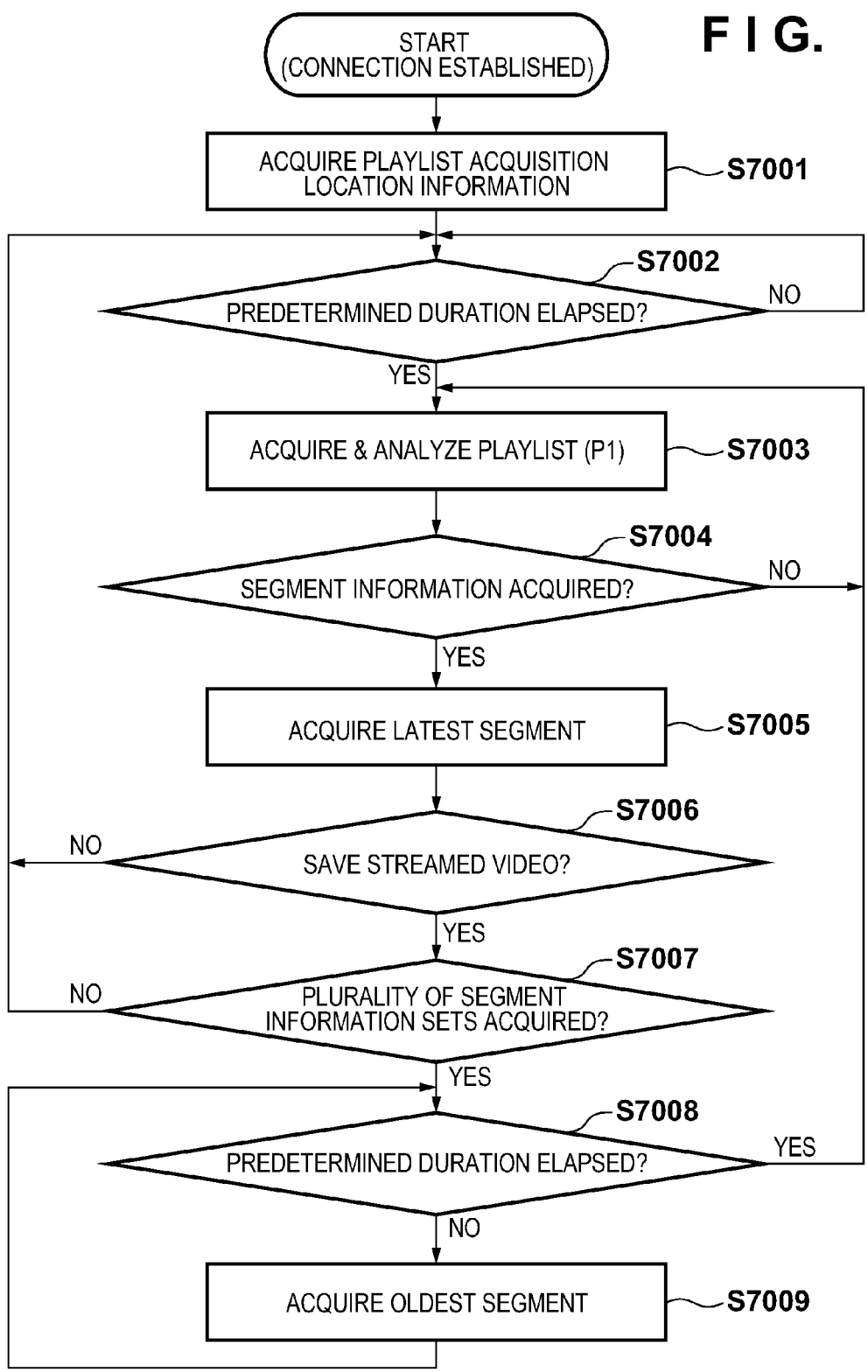
FIG. 7 is a diagram showing a flowchart of processing by the terminal apparatus 2000 according to the first embodiment.

In FIGS. 6 and 7, examples of processing flows applicable to the first embodiment of the present invention are shown, and description will now be given in accordance with these flows. FIG. 6 is a processing flow executed by the CPU 1001 after the camera 1000 has established a connection with the terminal apparatus 2000.

At step S6001, processing for starting generation of segment data following the start of live streaming is performed. The CPU 1001 starts signal output from the image capturing device 1014, processes the output into suitable video data using the camera signal processor 1015, and passes the data to the encoding/decoding processing unit 1016. The encoding/decoding processing unit 1016 compression encodes the received video data into a predetermined format at a predetermined bit rate, and, furthermore, starts processing for dividing the video data into segments of the predetermined duration Ts (0.5 seconds in the present embodiment).

At step S6002, it is determined whether generation of one segment (0.5 seconds) has been completed. It is checked whether data divided into a 0.5 second segment has been temporarily saved in the RAM 1003 or the recording medium 1012. If completed, the processing advances to step S6003, and if not completed, the processing advances to step S6005. Note that although this step is described in terms of the determination being performed by query (polling), it is also possible to determine that generation has been completed by a method such as notification by interrupt after detecting that divided segment data has been written.

At step S6003, generation of segment information is performed. Path information associated with the duration of the generated segment data and a storage location address, filename or the like that is able to specify the segment data is generated. Here, in the description of the present embodiment, the duration of a segment is fixed at 0.5 seconds.

At step S6004, the segment information generated at step S6003 is added to the playlist. For example, an exemplary playlist 5011 in FIG. 5A becomes an exemplary playlist 5020, and an exemplary playlist 5030 becomes an exemplary playlist 5040.

At step S6005, it is determined whether there is a playlist acquisition request from the terminal apparatus 2000 (step 3005). If there is a playlist acquisition request, the processing advances to step S6006, and if not, the processing advances to step S6007.

At step S6006 (first transmission processing), in response to the playlist acquisition request (step 3005), transmission of the playlist is performed (step 3006).

At step S6007, it is determined whether there is a segment acquisition request from the terminal apparatus 2000 (step 3007). If there is a segment acquisition request, the processing advances to step S6008, and if not, the processing returns to step S6002.

At step S6008, it is determined whether the segment requested at step S6007 is valid. If the segment is valid, the processing advances to step S6009, and if invalid, the processing advances to step S6010.

At step S6009 (second transmission processing), in response to the segment acquisition request (step 3007), transmission of the corresponding segment (step 3008) is performed. Thereafter, the segment that has been transmitted is deleted, information relating to the segment is deleted from the playlist, and the processing returns to step S6002. For example, an exemplary playlist 5010 becomes an exemplary playlist 5011, and an exemplary playlist 5040 becomes an exemplary playlist 5050.

At step S6010, in response to the segment acquisition request (step 3007), error status transmission (step 3008) is performed, and the processing returns to step S6002.

Note that although the event determination steps S6002, S6005 and S6007 in the present flow are described in terms of the determination being performed by query in order, the individual processing may be executed in order of event occurrence in the case of simultaneously performing event queuing for various conditions. As is evident from the above description, it should be noted that the image capturing apparatus 1000 performs processing for updating the playlist (management processing) both at the timing at which new segments are acquired from the image capturing device 1014 and at the timing at which segments are transmitted to the terminal apparatus 2000.

FIG. 7 is a processing flow executed by the CPU 2001 after the terminal apparatus 2000 establishes connection with the camera 1000.

At step S7001, playlist acquisition location information is acquired from the device/playlist acquisition location information acquired at the time of connection (step 3004), and held. At step S7002, it is determined whether a predetermined duration has elapsed. If the predetermined duration has elapsed, the processing advances to step S7003, and if not, step S7002 is repeated again. Here, the predetermined duration desirably is a value equivalent to the predetermined duration Ts that is generated by the camera 1000.

At step S7003, a playlist acquisition request (step 3005) is sent using the playlist acquisition location information acquired at step S7001, and a playlist (P1) acquired from the camera 1000 is analyzed. Analysis of the playlist involves acquiring segment information, after checking the playlist format and version using identification tags.

At step S7004, it is determined whether segment information was acquired at step S7003. If segment information was acquired, the processing advances to step S7005, and if not, the processing returns to step S7003.

At step S7005 (first video acquisition processing), if one segment information set was acquired, that segment is taken as the latest segment. Also, if a plurality of segment information sets were acquired, the segment information set described last in the playlist is taken as the latest segment. A segment acquisition request (step 3007) is then sent to the acquisition location path of the latest segment information, and the segment is acquired from the camera 1000. It should be noted that because the latest segment is acquired, segments that are not the latest segment are in a non-acquirable state at this stage. Processing for acquiring a segment that has not been acquired originating from this acquisition of the latest segment is performed at step S7009 discussed later. Note that in the case where an instruction to save streaming has already been set by the user in the terminal apparatus 2000, the CPU 2001, at step S7005, performs processing for recording the received segment to the recording medium 2012.

The acquired segment, after being recorded to the RAM 2003 or the recording medium 2012, is passed to the encoding/decoding processing unit 2013 and decoded, after which play/display (video display) is performed by the display unit 2007 via the output processing unit 2006. Also, in the case where the terminal apparatus REC 8007 is being executed by the live streaming application, a data portion obtained by excluding the header and the like from the decoded data or the segment is saved to the recording medium 2012 by separate processing from the present processing flow.

At step S7006, it is determined whether an instruction to save video that is being streamed has been given in the terminal apparatus 2000. In other words, it is determined whether the terminal apparatus REC 8007 by the live streaming application that operates on the terminal apparatus 2000 is being executed. If a streaming save instruction has been set, the processing advances to step S7007, and if the streamed video is not being saved, the processing returns to step S7002. In other words, acquisition of one playlist and acquisition of one segment can be seen as one set of processing for play processing.

At step S7007, it is determined whether a plurality of segment information sets were acquired at step S7003. If a plurality of information sets were acquired, the processing advances to step S7008, and if one information set was acquired, the processing returns to step S7002.

At step S7008, it is determined whether a predetermined duration has elapsed, similarly to step S7002. If a predetermined duration has elapsed, the processing returns to step S7003, and if not, the processing advances to step S7009. Here, the predetermined duration desirably is set to a value equivalent to the predetermined duration Ts that is generated by the camera 1000.

At step S7009 (second video acquisition processing), the CPU 2001 sends a segment acquisition request (step 3007) to the acquisition location path of the oldest segment information in the playlist, and acquires the corresponding segment from the camera 1000.

At step S7009, the acquired segment is recorded to the RAM 2003 or the recording medium 2012. The segment acquired here, being older than the segment acquired at step S7005, is not used for play, and a data portion obtained by excluding the header and the like from the decoded data or the segment is saved to the recording medium 2012 by separate processing from this processing flow. At this time, processing for merging received segment data sets in the original order, that is, in the temporal order in which the data was captured, is performed. Seamless data restoration is thereby possible separately from play.

Although a detailed description has been given above based on favorable embodiments according to the present invention, the present invention is not limited to these specific embodiments, and various configurations within a range that does not depart from the gist of this invention are also included in the present invention. Some of the above-mentioned embodiments may also be combined as appropriate.

In the above embodiments, the timing for executing step S7009 is given as when it is determined that the streamed video is being saved (Yes in S7006), there are a plurality of segments in the playlist (Yes in S7007), and the predetermined duration has not elapsed (No in S7008), but the present invention is not limited thereto. For example, this processing may be performed in the case where an instruction to "end saving (recording)" is received from the user. As a result, because segments captured after the instruction to end saving need not be received, segments that have not yet been received can be received collectively, and the segments, when all together, can be saved as a single file of streaming data.

An example was described in which one of the conditions for executing step S7009 of FIG. 7 was the requirement that streamed video is being saved in the terminal apparatus 2000 (step S7006 is Yes). However, in order to also enable so-called chasing play in which time shift play is performed during play, the condition of step S7009 may be omitted.

In the flowchart of FIG. 7, after the latest segment is acquired at S7005, the processing returns to S7003 and the playlist is acquired, but even in the case where acquisition of the latest segment fails at S7005, the processing returns to S7003, and the playlist is requested and acquired. In other words, the latest playlist is requested whenever the latest segment is requested.

Second Embodiment

According to the first embodiment, information showing segments that the terminal apparatus 2000 was not able to acquire due to factors such as network congestion are added to the playlist by the camera 1000. In other words, in some cases, the size of the playlist will grow.

In a second embodiment, an example is described in which an increase in the size of the playlist is suppressed, by rewriting segments that are temporally continuous, among the segment that are yet to be transmitted, as a single segment in the camera 1000. Note that the camera 1000 and the terminal apparatus 2000 are assumed to have similar configurations to the first embodiment, and description thereof will be omitted. The point that the length Ts of the segments is 0.5 seconds is also the same as the first embodiment.

Figure 9A:
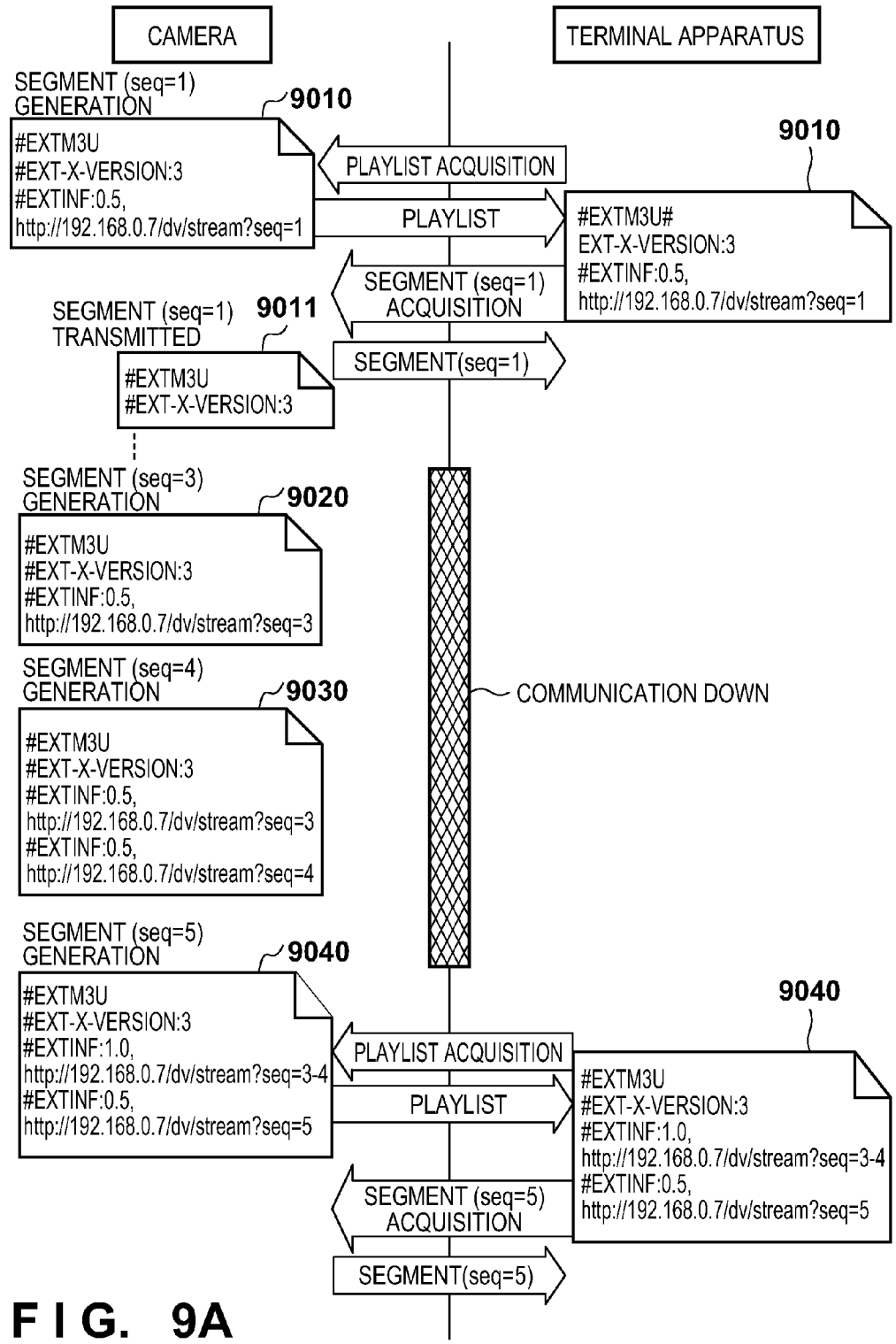
FIGS. 9A and 9B are diagrams showing an exemplary transition of a playlist including at a time of congestion according to a second embodiment.
Figure 9B:
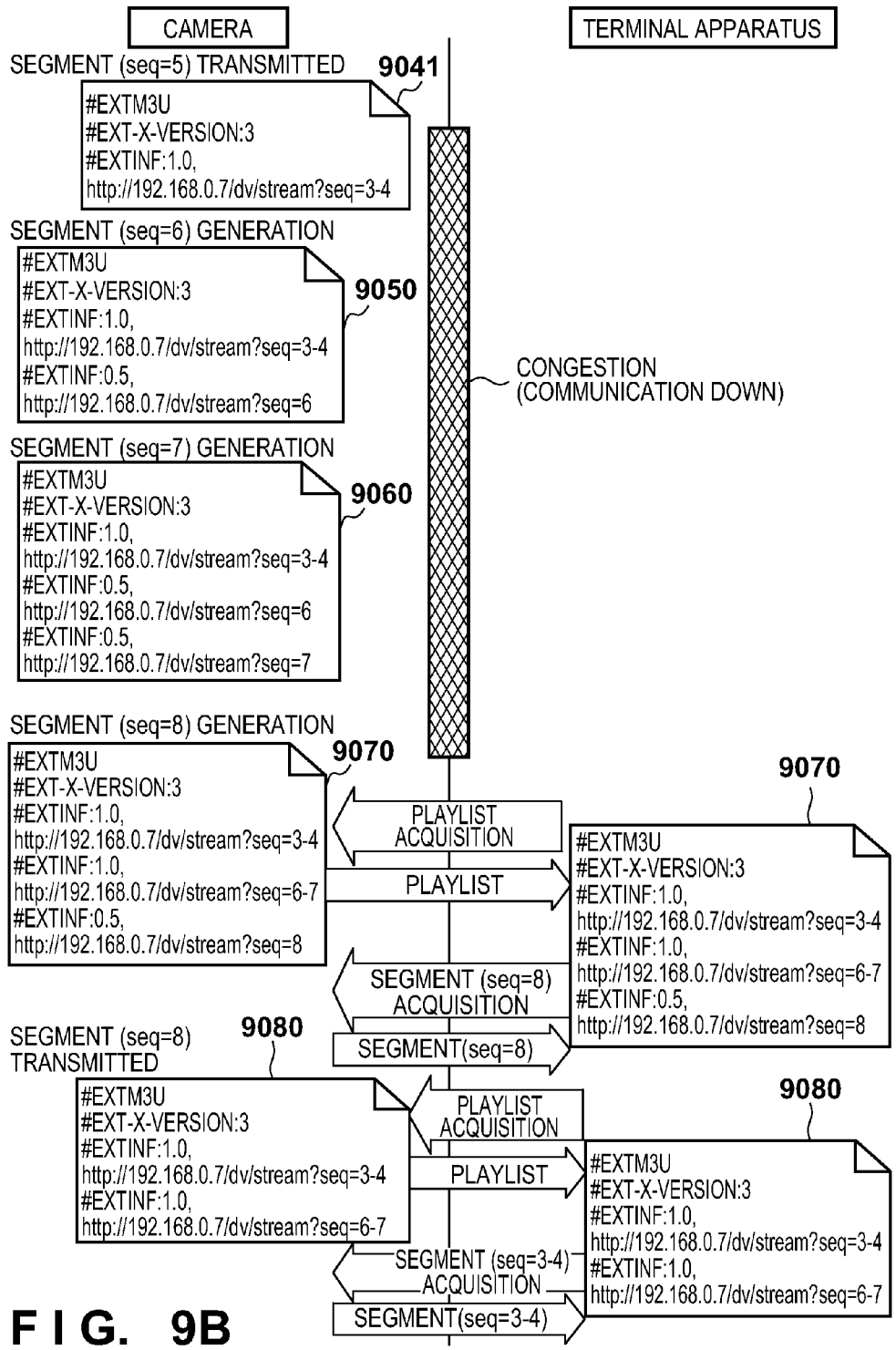

FIGS. 9A and 9B show the transition of a playlist at the time of typical congestion, for the purposes of illustrating the second embodiment. The reference numerals 9010 to 9080 show a playlist at various stages.

Note that the camera 1000 and the terminal apparatus 2000 of the present embodiment also only perform streaming in a one-to-one connection.

Figure 10:
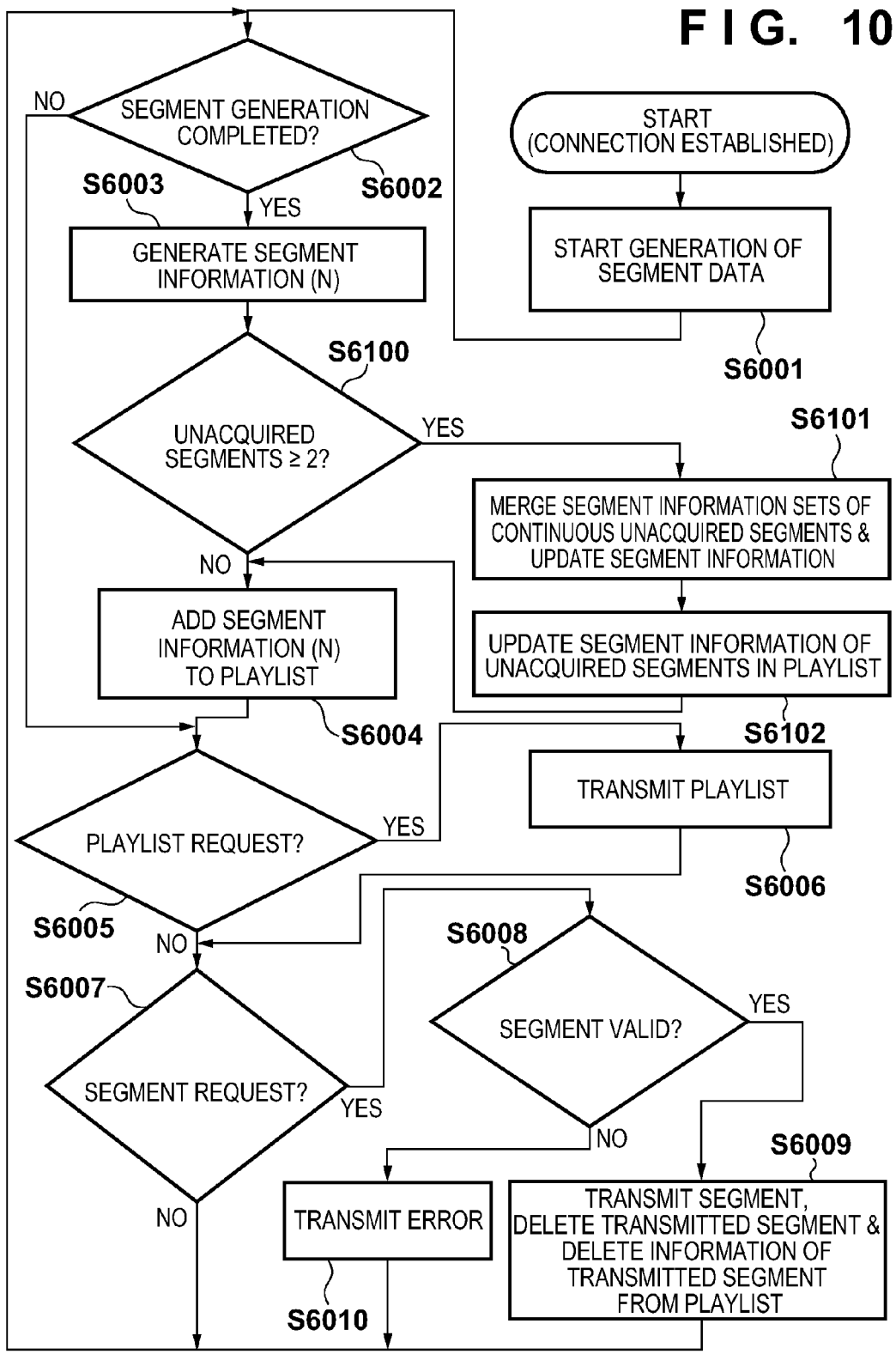
FIG. 10 is a diagram showing a flowchart of processing by the camera 1000 according to the second embodiment.
Figure 11:
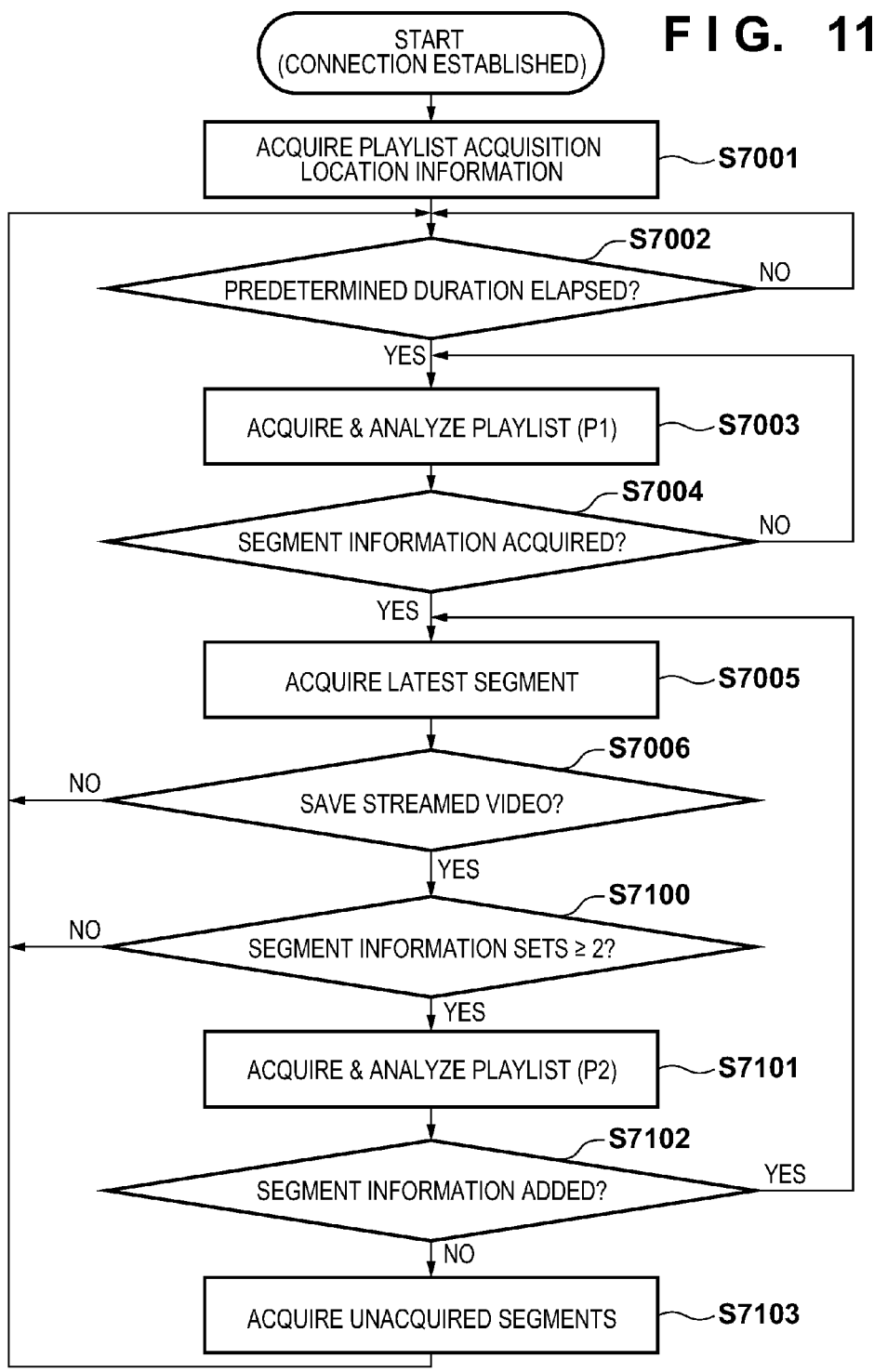
FIG. 11 is a diagram showing a flowchart of processing by the terminal apparatus 2000 according to the second embodiment.

Because the flowcharts of FIGS. 10 and 11 replace FIGS. 6 and 7 of the first embodiment, the same reference numerals are given to processing that is the same.

First, the processing flow that is executed by the CPU 1001 after the camera 1000 has established a connection with the terminal apparatus 2000 will be described, in accordance with the flowchart in FIG. 10.

At step S6001, processing for starting generation of segment data following the start of live streaming is performed. The CPU 1001 starts signal output from the image capturing device 1014, processes the output into suitable video data using the camera signal processor 1015, and passes the data to the encoding/decoding processing unit 1016. The encoding/decoding processing unit 1016 compression encodes the received video data into a predetermined format at a predetermined bit rate, and, furthermore, starts processing for dividing the video data into segments of the predetermined duration Ts (also 0.5 seconds in the second embodiment). In short, the CPU 1001 performs processing for encoding the video data obtained from the image capturing device 1041 in units of 0.5 seconds, and storing the encoded data in the RAM 1003 or the recording medium 1012 as a single file.

At step S6002, it is determined whether generation of one segment (0.5 seconds) has been completed. It is checked whether data divided into a 0.5 second segment is saved in the RAM 1003 or the recording medium 1012. If completed, the processing advances to step S6003, and if not completed, the processing advances to step S6005. Note that although this step is described in terms of the determination being performed by query (polling), it is also possible to determine that generation has been completed by a method such as notification by interrupt after detecting that divided segment data has been written.

At step S6003, segment information is generated. Path information associated with the duration of the generated segment data and a storage location address, filename or the like that is able to specify the segment data is generated. Here, in the description of this second embodiment, the duration of a segment is fixed at 0.5 seconds.

At step S6100, it is determined whether there are two or more segments that the terminal apparatus 2000 has not yet acquired. In other words, it is determined whether two or more segment information sets (4013, 4014) are included in the playlist. If two or more segment information sets (4013, 4014) are included (exemplary playlist 9030), the processing advances to step S6101, and if two or more segment information sets are not included (exemplary playlist 9011), or if only one segment information set is included (exemplary playlist 9020), the processing advances to step S6004.

At step S6101, continuous segments that have not yet been acquired are merged, and segment duration (segment information) and segment path information are merged. At step S6102, update processing for reflecting the information merged at step S6101 in the playlist is performed. Note that the merging of the segments themselves may be performed after a segment request is actually received.

At step S6004, the segment information generated at step S6003 is added to the playlist. After the end of this step, the segment information of each playlist determined at step S6100 will be the latest segment information and, in the case where there are unacquired segments, a plurality of unacquired segment information sets in which continuous segments are merged. In other words, the exemplary playlist 9030 becomes an exemplary playlist 9040, the exemplary playlist 9011 becomes an exemplary playlist 9020, the exemplary playlist 9020 becomes the exemplary playlist 9030, and an exemplary playlist 9060 becomes an exemplary playlist 9070.

At step S6005, it is determined whether there is a playlist acquisition request (step 3005) from the terminal apparatus 2000. If there is a playlist acquisition request, the processing advances to step S6006, and if not, the processing advances to step S6007.

At step S6006, in response to the playlist acquisition request (step 3005), transmission of the playlist is performed (step 3006).

At step S6007, it is determined whether there is a segment acquisition request (step 3007) from the terminal apparatus 2000. If there is a segment acquisition request, the processing advances to step S6008, and if not, the processing returns to step S6002.

At step S6008, it is determined whether the segment requested at step S6007 is valid. If the segment is valid, the processing advances to step S6009, and if invalid, the processing advances to step S6010.

At step S6009, in response to the segment acquisition request (step 3007), transmission of the corresponding segment (step 3008) is performed, after which the segment is deleted, related segment information is deleted from the playlist, and the processing returns to step S6002. On the other hand, at step S6010, in response to the segment acquisition request (step 3007), error status transmission (step 3008) is performed, and the processing returns to step S6002.

Note that although the event determination steps S6002, S6005 and S6007 in the present flow are described in terms of the determination being performed by query in order, the individual processing may be executed in order of event occurrence in the case of simultaneously performing event queuing for various conditions.

FIG. 11 is a processing flow that is executed by the CPU 2001 after the terminal apparatus 2000 has established a connection with the camera 1000.

At step S7001, playlist acquisition location information is acquired from the device/playlist acquisition location information acquired at the time of connection (step 3004), and held.

At step S7002, it is determined whether a predetermined duration has elapsed. If the predetermined duration has elapsed, the processing advances to step S7003, and if not, step S7002 is repeated again. Here, the predetermined duration desirably is a value equivalent to the predetermined duration Ts that is generated by the camera 1000.

At step S7003, a playlist acquisition request (step 3005) is sent, using the playlist acquisition location information acquired at step S7001, and a playlist (P1) acquired from the camera 1000 is analyzed. Analysis of the playlist involves acquiring segment information after checking the playlist format and version using identification tags.

At step S7004, it is determined whether segment information was acquired at step S7003. If segment information was acquired, the processing advances to step S7005, and if not, the processing returns to step S7003.

At step S7005, if one segment information set was acquired, that segment is taken as the latest segment. Also, if a plurality of segment information sets were acquired, the last segment information set is taken as the latest segment. A segment acquisition request (step 3007) is then sent to the acquisition location path of the latest segment information, and the segment is acquired from the camera 1000.

The acquired segment, after being recorded to the RAM 2003 or the recording medium 2012, is passed to the encoding/decoding processing unit 2013 and decoded, after which play/display (video display) is performed by the display unit 2007 via the output processing unit 2006. Also, in the case where the terminal apparatus REC 8007 is being executed by the live streaming application, a data portion obtained by excluding the header and the like from the decoded data or the segment is saved to the recording medium 2012 by separate processing from the present processing flow.

At step S7006, it is determined whether video that is being streamed is being saved in the terminal apparatus 2000. In other words, it is determined whether the terminal apparatus REC 8007 by the live streaming application that operates on the terminal apparatus 2000 is being executed. If the streamed video is being saved, the processing advances to step S7100, and if the streamed video is not being saved, the processing returns to step S7002.

At step S7100, it is determined whether two or more segment information sets were acquired at step S7003. If there are two or more information sets, the processing advances to step S7101, and if there is one information set, the processing returns to step S7002. Here, the number of segment information sets is given as Sn. At step S7101, similarly to step S7003, a playlist acquisition request (step 3005) is sent again, a playlist (P2) is acquired from the camera 1000, and segment information is acquired.

At step S7102, the number of segment information sets acquired at step S7101 that have been newly added is determined. If the number of information sets is greater than Sn−1, this means that new segments were generated during the period from when the playlist was acquired at step S7003 until when the playlist was acquired at step S7101, and thus the processing returns to step S7005. If the number of information sets is Sn−1, it is judged that there are old segments that have not yet been acquired, and the processing advances to step S7103.

At step S7103, a segment acquisition request is sent to the acquisition location path of unacquired segment information (step 3007), and an old segment is acquired from the camera 1000 and recorded to the RAM 2003 or the recording medium 2012. The segment acquired here, being older than the segment acquired at step S7005, is not used for play, and a data portion obtained by excluding the header and the like from the decoded data or the segment is saved to the recording medium 2012 by separate processing from this processing flow. At this time, merging received segment data sets in the original order enables seamless data restoration separately from play.

Note that while a configuration in which segments that have not yet been acquired are collected together as one segment information set was described in the present embodiment, it is possible with this configuration to increase the size of the segments relative to one segment information set. In view of this, a configuration may be adopted in which a threshold, being as upper limit for one segment information set, such as 5 seconds worth of segments or ten segments per information set, for example, is set in advance, and if this threshold is exceeded, a new segment information set is created. Subsequent segment information can then be merged with the newly created segment information.

In the present embodiment, if a playlist already has two or more segment information sets, the segment information sets are merged. Alternatively, segment information sets may be merged in the case where, for example, there are 2 seconds or more worth of temporally continuous segments or where there are four or more continuous segments. It should be noted that the values given here, such as 2 seconds and 4 segments, are by way of example.

Although the second embodiment has been discussed in detail above, the present invention is not limited to these specific embodiments, and various configurations within a range that does not depart from the gist of this invention are also included in the present invention. Some of the above-mentioned embodiments may also be combined as appropriate.

The case where a software program that realizes the functions of the first or second embodiments is supplied to a system or an apparatus having a computer capable of executing a program directly from a recording medium or using wired/wireless communication and this program is executed is also included in the present invention.

Accordingly, in order to realize the functional processing of the present invention with a computer, the present invention is realized by the program code itself, which is supplied to the computer and installed thereon. In other words, the computer program for realizing the functional processing of the present invention is itself included in the present invention.

In this case, as long as the functions of a program are realized, any configuration of a program is possible, such as a program that is executed by an interpreter, script data that is supplied to an OS, or the like.

A recording medium for supplying the program may be, for example, a hard disk, a magnetic recording medium such as magnetic tape, an optical/magneto-optical storage medium, or a nonvolatile semiconductor memory.

Conceivable methods of supplying the program include a computer program for forming the present invention being stored in a server on a computer network, and a client computer connected to the computer network downloading and executing the computer program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-269785, filed Dec. 10, 2012, which is hereby incorporated by reference herein in its entirety.

What is claimed is:

1. An information processing apparatus that has a communication unit for communicating with an image capturing apparatus and plays video data captured by the image capturing apparatus by sequentially acquiring segments, which are each a portion of the video data, said apparatus comprising:
- a list requesting unit that sends, to the image capturing apparatus via the communication unit, a request for a segment list, where the segment list includes segment information indicating at least one segment which the image capturing apparatus has not yet sent to the information processing apparatus among segments of video data that is being captured by the image capturing apparatus;
- a list acquisition unit that acquires, from the image capturing apparatus, the segment list requested by the segment list requesting unit;
- a first determination unit that determines a latest segment, as a live image to be played, among the segments indicated in the segment list acquired by the list acquisition unit;
- a first segment requesting unit that sends a request for the segment determined by the first determination unit to the image capturing apparatus via the communication unit;
- a first segment acquisition unit that acquires the segment requested by the first segment requesting unit; and
- a playing unit that plays, as the live image, the segment acquired by the first segment acquisition unit;
- wherein the list requesting unit sends a request for a latest segment list to the image capturing apparatus, whenever the segment is acquired by the first segment acquisition unit.

2. The information processing apparatus according to claim 1, wherein the list requesting unit sends a request for a latest segment list to the image capturing apparatus, whenever the segment is requested or acquired one time by the first segment requesting unit or the first segment acquisition unit.

3. The information processing apparatus according to claim 1, wherein the first segment acquisition unit stores the acquired segment into a predetermined storage,
- wherein the apparatus further comprising:
- a second determination unit that determines whether the segment list acquired by the first segment acquisition unit includes information indicating a past segment other than the latest segment to be played by the playing unit; and
- a control unit that, if it is determined that the past segment is indicated in the segment list acquired by the first segment acquisition unit, acquires the past segment by sending a request for the past segment to the image capturing apparatus, and stores the acquired past segment into the predetermined storage without playing the past segment by the playing unit,
- wherein the control unit merges, in temporal order, the segments stored in the predetermined storage to generate a seamless video data.

4. The information processing apparatus according to claim 3, wherein the control unit includes:
- a saving unit that saves the merged video data.

5. The information processing apparatus according to claim 4, further comprising a setting unit that sets whether video data captured by the image capturing apparatus is to be saved by the saving unit,
- wherein if saving of video data is set by the setting unit, the control unit acquires the past segment.

6. The information processing apparatus according to claim 3, wherein the control unit sends a request for an oldest segment, as the past segment, among the segments indicated in the latest segment list.

7. The information processing apparatus according to claim 1, wherein the segment information includes information for specifying a segment and information of a time length of the segment.

8. The information processing apparatus according to claim 1, wherein the information processing apparatus is a mobile phone.

9. The information processing apparatus according to claim 1, wherein the information processing apparatus is a tablet device.

10. A method for controlling an information processing apparatus that has a communication unit configured to communicate with an image capturing apparatus and plays video data captured by the image capturing apparatus by sequentially acquiring segments, which are each a portion of the video data, comprising:
- a list requesting step of sending a request, to the image capturing apparatus via the communication unit, for a segment list, where the segment list includes segment information indicating at least one segment which the image capturing apparatus has not yet sent to the information processing apparatus among segments of video data that is being captured by the image capturing apparatus;
- a list acquisition step of acquiring, from the image capturing apparatus, the segment list requested in the segment list requesting step;
- a first determination step of determining a latest segment, as a live image to be played, among the segments indicated in the segment list acquired in the list acquisition step;
- a first segment requesting step of sending a request for the segment determined by the first determination step to the image capturing apparatus via the communication unit;
- a first segment acquisition step of acquiring the segment requested in the first segment requesting step; and
- a playing step of playing, as the live image, the segment acquired in the first segment acquisition step,
- wherein, in the list requesting step, a request for a latest segment list is sent to the image capturing apparatus, whenever the segment is acquired in the first segment acquisition step.

11. A non-transitory computer-readable storing medium storing a program which, when executed on a computer, causes that computer to perform a method for controlling an information processing apparatus that has a communication unit configured to communicate with an image capturing apparatus and plays video data captured by the image capturing apparatus by sequentially acquiring segments, which are each a portion of the video data, the method comprising:
- a list requesting step of sending a request, to the image capturing apparatus via the communication unit, for a segment list, where the segment list includes segment information indicating at least one segment which the image capturing apparatus has not yet sent to the information processing apparatus among segments of video data that is being captured by the image capturing apparatus;
- a list acquisition step of acquiring, from the image capturing apparatus, the segment list requested in the segment list requesting step;

a first determination step of determining a latest segment, as a live image to be played, among the segments indicated in the segment list acquired in the list acquisition step;

a first segment requesting step of sending a request for the segment determined by the first determination step to the image capturing apparatus via the communication unit;

a first segment acquisition step of acquiring the segment requested in the first segment requesting step; and a playing step of playing, as the live image, the segment acquired in the first segment acquisition step, wherein, in the list requesting step, a request for a latest segment list is sent to the image capturing apparatus, whenever the segment is acquired in the first segment acquisition step.

* * * * *